(12) United States Patent
Yuge et al.

(10) Patent No.: US 6,382,706 B2
(45) Date of Patent: May 7, 2002

(54) OPERATING DEVICE FOR AUTOMOTIVE PIVOTAL DOOR

(75) Inventors: Masaaki Yuge; Zhenjia Zhou, both of Yokohama (JP)

(73) Assignee: Ohi Seisakusho Co., Ltd., Kanagawa (JP)

( * ) Notice: Subject to any disclaimer, the term of this patent is extended or adjusted under 35 U.S.C. 154(b) by 0 days.

(21) Appl. No.: 09/813,980

(22) Filed: Mar. 22, 2001

(30) Foreign Application Priority Data

Mar. 28, 2000 (JP) ........................................ 2000-089768
Mar. 30, 2000 (JP) ........................................ 2000-092715

(51) Int. Cl.⁷ ................................................. B60J 5/10
(52) U.S. Cl. ................................ 296/146.4; 296/146.8; 296/106
(58) Field of Search ........................ 296/146.8, 106, 296/56, 146.4; 49/341, 342, 339

(56) References Cited

U.S. PATENT DOCUMENTS 1,668,421 A * 5/1928 Rysdon ..................... 49/341 X
6,142,551 A * 11/2000 Ciavaglia et al. ..... 296/146.8 X
6,318,025 B1 * 11/2001 Sedlak ...................... 296/56 X

FOREIGN PATENT DOCUMENTS

JP            9-125820          5/1997

* cited by examiner

Primary Examiner—Dennis H. Pedder
(74) Attorney, Agent, or Firm—Sughrue Mion, PLLC

(57) ABSTRACT

An operating device for operating an automotive pivotal door has the following elements, which are an electric motor of reversible type; a speed reduction device driven by the motor and having an output part formed into an output gear; a rack member having a toothed side edge meshed with the output gear, so that upon energization of the motor, the rack member is moved axially; a motion transmitting member having one end pivotally connected to one end of the rack member and the other end connected to the pivotal door; and a structure which permits a swing movement of the rack member about an axis of the output gear when an external force is applied to the rack member in a direction to swing the same during the axial movement of the rack member. For appropriately controlling the operating device, a computer-aided control unit is employed.

25 Claims, 15 Drawing Sheets

OPERATING DEVICE FOR AUTOMOTIVE PIVOTAL DOOR

BACKGROUND OF THE INVENTION

1. Field of the Invention

The present invention relates in general to operating devices for operating automotive doors, and more particularly to operating devices of a type which opens and closes an automotive pivotal door.

2. Description of the Related art

In order to clarify the task of the present invention, some known operating devices for automotive pivotal doors will be briefly described before commencing the detailed explanation of the present invention.

Japanese Utility Model First Provisional Publication 6-71852 shows an operating device for a pivotal back door of a motor vehicle. The operating device generally comprises an electric motor which is mounted on a body of the vehicle, a pinion which is driven by the motor, a sector gear which is meshed with the pinion and pivotally held by the vehicle body and a rod member which has one end pivotally connected to the sector gear and the other pivotally connected to the pivotal back door. Upon operation of the electric motor, the pinion pivots the sector gear in one or the other direction thereby to push or pull the pivotal back door through the rod member. With this, the pivotal back door is swung toward an open or close position. For the pivotal movement of the rod member relative to both the sector gear and the pivotal back door, there are employed ball-joints respectively.

Japanese Patent First Provisional Publication 9-125820 shows a so-called semi-automatic operating device for an automotive door. That is, when, due to manual handling by an operator, the door is moved slightly toward an open or close position, the operating device senses the movement and then moves the door in the desired direction by force of an electric motor. The publication further shows a technique that avoids or lessens a shock which would be sensed by the operator when the door operation switches from the manual handling to the auto-driving. More specifically, by the technique, only when the moving speed of the door in the manual driving is within a predetermined range, the auto-driving follows. Thus, when the movement of the door by the manual handling is excessively high in speed at the beginning of door operation, the auto-driving for the door does not take place. That is, in this case, opening or closing of the door is entirely carried out by manual labor.

However, due to their inherent constructions, even the above-mentioned known operating devices have failed to provide users with a satisfaction. That is, in the former device, usage of the ball-joints brings about a complicated and costly construction, and in the latter device, even if the movement of the door by the manual handling is adequately slow, the auto-driving for the door suddenly takes place when the manual movement is kept for over a certain time, which produces a certain shock sensed by the operator.

SUMMARY OF THE INVENTION

It is therefore an object of the present invention to provide an operating device for an automotive door, which is free of the above-mentioned drawbacks.

According to a first aspect of the present invention, there is provided an operating device for operating a pivotal door, which comprises an electric motor of reversible type; a speed reduction device driven by the motor, the speed reduction device having an output part formed into an output gear; a rack member having a toothed side edge meshed with the output gear, so that upon energization of the motor, the rack member is moved axially; a motion transmitting member having one end pivotally connected to one end of the rack member and the other end connected to the pivotal door; and a structure which permits a swing movement of the rack member about an axis of the output gear when an external force is applied to the rack member in a direction to swing the same during the axial movement of the rack member.

According to a second aspect of the present invention, there is provided an operating device for use in a motor vehicle having a pivotal door which is pivotally connected at its upper end to a rear end of a roof of the vehicle. The operating device operates the pivotal door and comprises an electric motor of reversible type mounted on the rear end portion of the roof; a speed reduction device connected to and driven by the motor, the speed reduction device having an output part formed into an output gear; a rack member having a toothed side edge meshed with the output gear, so that upon energization of the motor, the rack member is moved axially; a motion transmitting member having one end pivotally connected to one end of the rack member and the other end connected to the pivotal door; a holding member for holding the rack member permitting the axial movement of the rack member relative thereto, the holding member being held by the speed reduction device in a manner to be pivotal about the axis of the output gear; two rollers rotatably connected to the holding member, each roller putting thereon the other side edge of the rack member; a cover member connected to the holding member to define therebetween a space through which the rack member axially moves; an outer slider of plastics disposed between the rack member and the cover member to smooth the axial movement of the rack member relative to the cover member; an inner slider of plastics disposed between the rack member and the holding member to smooth the axial movement of the rack member relative to the holding member; and a biasing member held by the holding member to bias the rack member toward the output gear to assure the meshed engagement between the rack member and the output gear.

According to a third aspect of the present invention, there is provided an operating device for use in a motor vehicle having a pivotal door which is pivotally connected at its upper end to a rear end of a roof of the vehicle. The operating device operates the pivotal door and comprises an electric motor of reversible type mounted on the rear end portion of the roof; a speed reduction device connected to and driven by the motor, the speed reduction device having an output part formed into an output gear; a rack member having a toothed side edge meshed with the output gear, so that upon energization of the motor, the rack member is moved axially; a motion transmitting member having one end pivotally connected to one end of the rack member and the other end connected to the pivotal door; a single roller rotatably connected to a case of the speed reduction device to put thereon the other side edge of the rack member, the roller being arranged to permit a pivotal movement of the rack member about the axis of the output gear; a cover member connected to the case of the speed reduction device to define therebetween a space through which the rack member axially moves; an outer slider of plastics disposed between the rack member and the cover member to smooth the axial movement of the rack member relative to the cover member; an inner slider of plastics disposed between the rack member and the case of the speed reduction device to smooth the axial movement of the rack member relative to the case; and a biasing member held by the case of the speed reduction device to bias the rack member toward the output gear to assure the meshed engagement between the rack member and the output gear.

BRIEF DESCRIPTION OF THE DRAWINGS

Other objects and advantages of the present invention will become apparent from the following description when taken in conjunction with the accompanying drawings, in which:

FIGS. 1 to 10 are drawings showing an operating device of a first embodiment of the present invention, wherein:

FIG. 1 is a rear side view of a motor vehicle having a pivotal back door, to which the operating device is practically applied;

FIG. 2 is a perspective view of the operating device, which is mounted on a rear end corner of a roof panel of the vehicle;

FIG. 3 is a side view of the operating device showing a condition to bring the back door to a full-close position;

FIG. 4 is a view similar to FIG. 3, but showing a condition to bring the back door to a full-open position;

FIG. 5 is a sectional view of a part of the operating device where an output gear, a rack member and rollers are arranged;

FIG. 6 is a back view of the operating device taken from a back side of the vehicle;

FIG. 7 is a plan view of the operating device taken from a top of the vehicle;

FIG. 8 is a sectional view of a drive unit installed in the operating device;

FIG. 9 is a side view of the operating device with a cover member removed; and

FIG. 10 is a side view of the operating device with some parts (viz., cover member and rack member) removed;

FIGS. 11 to 15 are drawings showing an operating device of a second embodiment of the present invention, wherein:

FIG. 11 is a side view of the operating device showing a condition to bring the back door to a full-close position;

FIG. 12 is a view similar to FIG. 11, but showing a condition to bring the back door to a full-open position;

FIG. 13 is a sectional view of a part of the operating device where an output gear, a rack member and a roller are arranged;

FIG. 14 is a side view of the operating device with a cover member removed;

FIG. 15 is a side view of the operating device with some parts (viz., rack member and cover member) removed;

DETAILED DESCRIPTION OF THE EMBODIMENTS

In the following, embodiments of the present invention will be described in detail with reference to the accompanying drawings.

For ease of understanding, various directional terms, such as, upper, lower, right, left, upward, downward and the like are used in the following description. However, it is to be noted that such terms are to be understood with respect to a drawing or drawings on which the corresponding part or portion is illustrated.

Referring to FIGS. 1 to 10, there is shown an operating device 8 of a first embodiment of the present invention.

Figure 1:
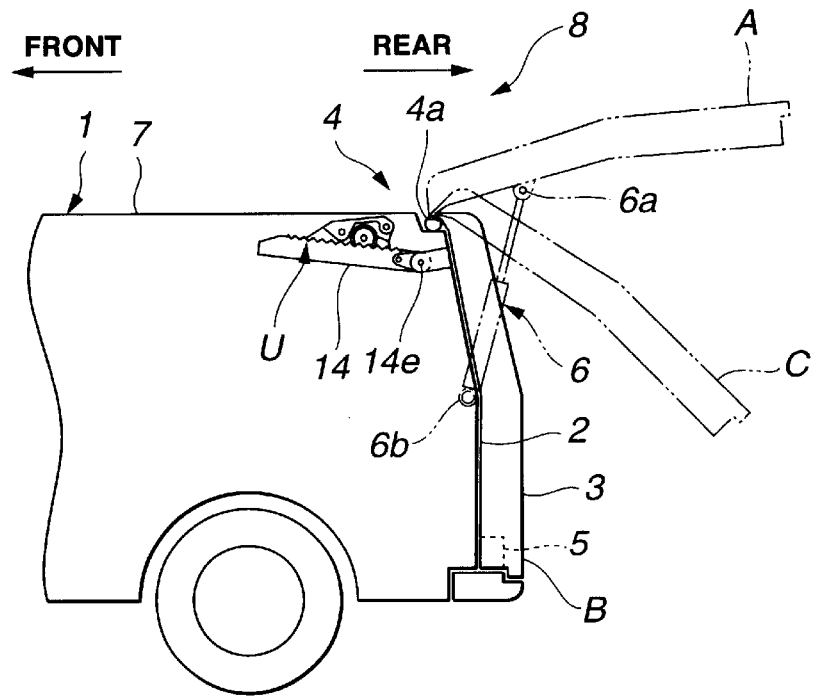

In FIG. 1, there is shown a rear part of a body 1 of a motor vehicle, to which the first embodiment of the present invention is practically applied.

The rear part of the vehicle body 1 has a back door opening 2 which faces backward, as shown. A back door 3 is pivotally connected to the opening 2, through hinges 4 arranged at an upper edge of the opening 2, so that the back door 3 pivots about a hinge pin axis 4a between a full-close position "B" to fully close the opening 2 and a full-open position "A" to fully open the opening 2. The position denoted by reference "C" is a neutral position of the back door 3. The angle defined between the full-close position "B" and the full-open position "A" is about 80 degrees.

The opening 2 is equipped at its lower edge with a striker. A lower end of the back door 3 is equipped with a lock device 5 which becomes engaged with the striker when the back door 3 is brought to the full-close position "B". The lock device 5 is equipped with an electric actuator which can cancel the engagement between the lock device 5 and the striker upon being energized.

A pair of gas-stays 6 are arranged between the vehicle body 1 and the back door 3. Each gas-stay 6 has an upper end 6a pivotally connected to the back door 3 and a lower end 6b pivotally connected to the vehicle body 1. Preferably, for the pivotal connection, ball-joints are used. Each gas-stay 6 contains therein a compressed gas by which a cylinder having the lower end 6b and a piston rod having the upper end 6a are biased in opposite directions, that is, in a direction to increase the length of the gas-stay 6. During the pivotal movement of the back door 3, the upper end 6a of each gas-stay 6 turns about the hinge pin axis 4a while describing an arc about the lower end 6b that is pivotally connected to the vehicle body 1. Thus, during the pivotal movement of the back door 3 between the full-close position "B" and the full-open position "A"s, each gas-stay 6 is subjected to a telescopic motion biasing the back door 3 in the opening direction or in the closing direction. It is to be noted that the neutral position "C" of the back door 3 is a position wherein the own weight of the back door 3 is balanced with the biasing force produced by the two gas-stays 6. More specifically, when the back door 3 assumes a half-open position above the neutral position "C", the gas-stays 6 function to bias the back door 3 toward the full-open position "A", while, when the back door 3 assumes a half-open position below the neutral position "C", the gas-stays 6 function to bias the back door 3 toward the full-close position "B".

Thus, in order to open the back door 3 which assumes the full-close position "B", engaged engagement between the lock device 5 and the striker is cancelled first, and then a certain external force is applied to the back door 3 to lift up the same to a position just above the neutral position "C". With this, the back door 3 is automatically lifted up to the full-open position "A" by the force of the gas-stays 6.

While, in order to close the back door 3 which assumes the full-open position "A", a certain force is applied to the back door 3 to pivot down the same to a position just below the neutral position "C" against the force of the gas-stays 6.

With this, the back door 3 is automatically pivoted down to the full-close position "B" by the newly produced force of the gas-stays 6.

As will be described in detail hereinafter, due to provision of the gas-stays 6, the operating device 8 of the invention for the back door 3 can function normally irrespective of a small driving force produced thereby.

Figure 2:
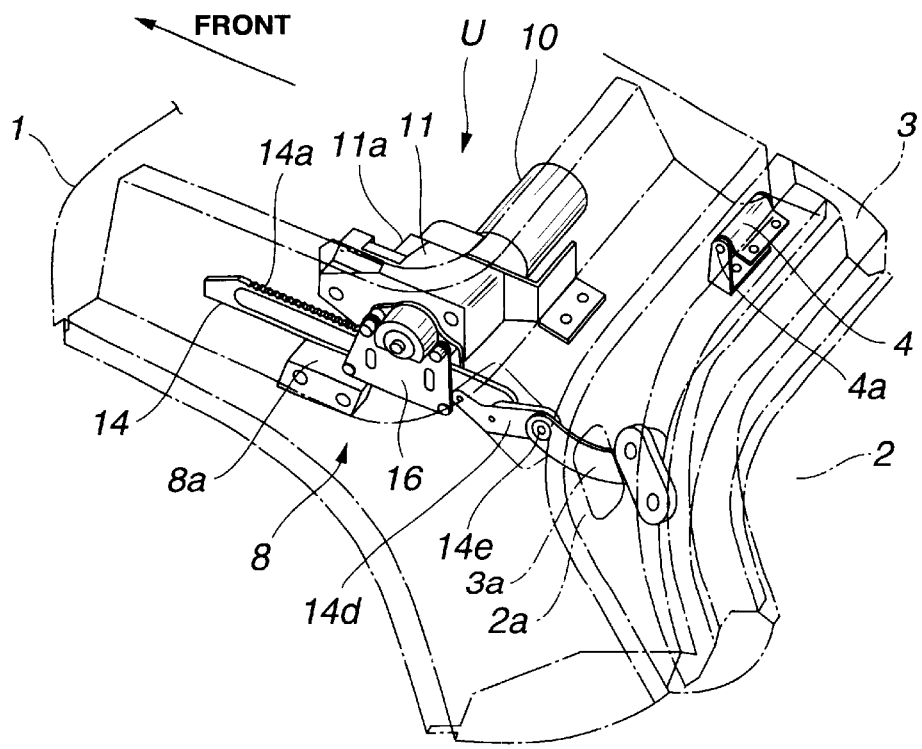

As is understood from FIGS. 1 and 2, on a rear end corner of a roof panel 7 of the vehicle body 1, there is mounted the operating device 8 through brackets 8a, which is the first embodiment of the present invention. Although not shown in the drawings, an interior trim is arranged beneath the roof panel 7 to conceal the operating device 8 from the interior of the vehicle body 1.

The operating device 8 comprises a reversible type electric motor 10 which is connected to a speed reduction device 11 mounted on the brackets 8a.

Figure 8:
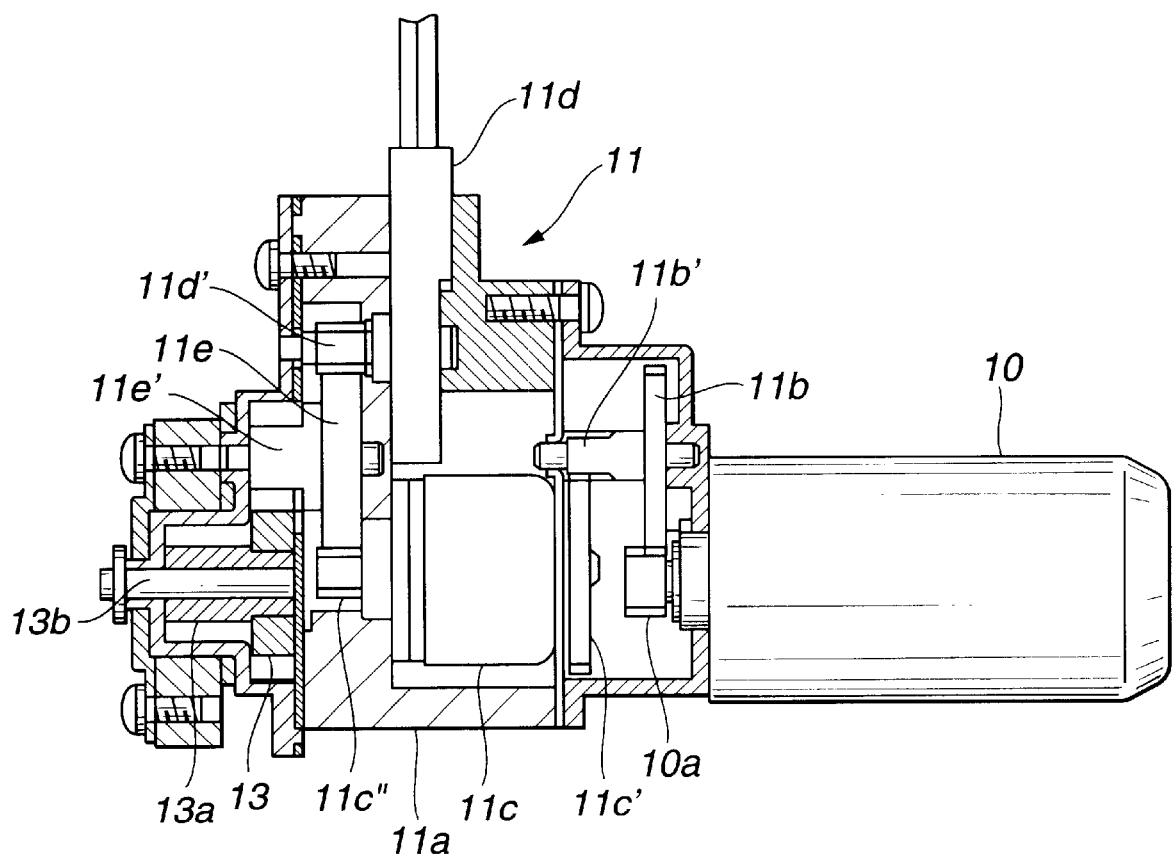

As is seen from FIG. 8, within a case 11a of the speed reduction device 11, there are mounted various parts of the device 11. That is, a larger diameter first gear 11b is meshed with a pinion 10a driven by the motor 10. A smaller diameter gear part 11b' of the first gear 11b is meshed with an input gear 11c' of an electromagnetic clutch 11c which functions to break and connect a torque transmission from the motor 10. An output gear 11c" of the clutch 11c is meshed with a larger diameter second gear 11e. An input gear 11d' of a rotary encoder 11d is engaged with the second gear 11e, which produces a pulse signal representing the rotation manner of the second gear 11e, that is, the moving manner of the back door 3. A smaller diameter gear part 11e' of the second gear 11e is meshed with a larger diameter gear part of a pinion 13. The pinion 13 is provided with an output gear 13a which is projected outward from the case 11a.

The rotary encoder 11d thus detects the number of rotation of the output gear 13a, which is used for controlling the operating device 8. Since the input gear 11d' of the rotary encoder 11d is arranged to rotate with the output gear 11c" of the electromagnetic clutch 11c, the rotary encoder 11d can sense the rotation of the output gear 13a caused by a manual handling to the back door 3. That is, under such movement of the back door 3 by the manual handling, the clutch 11c breaks the torque transmission from the motor 10 to the output gear 11c" permitting a free rotation of the output gear 11c".

Referring back to FIG. 2, the operating device 8 further comprises a rack member 14 which is meshed at its tooth portion 14a with the above-mentioned output gear 13a.

Figure 3:
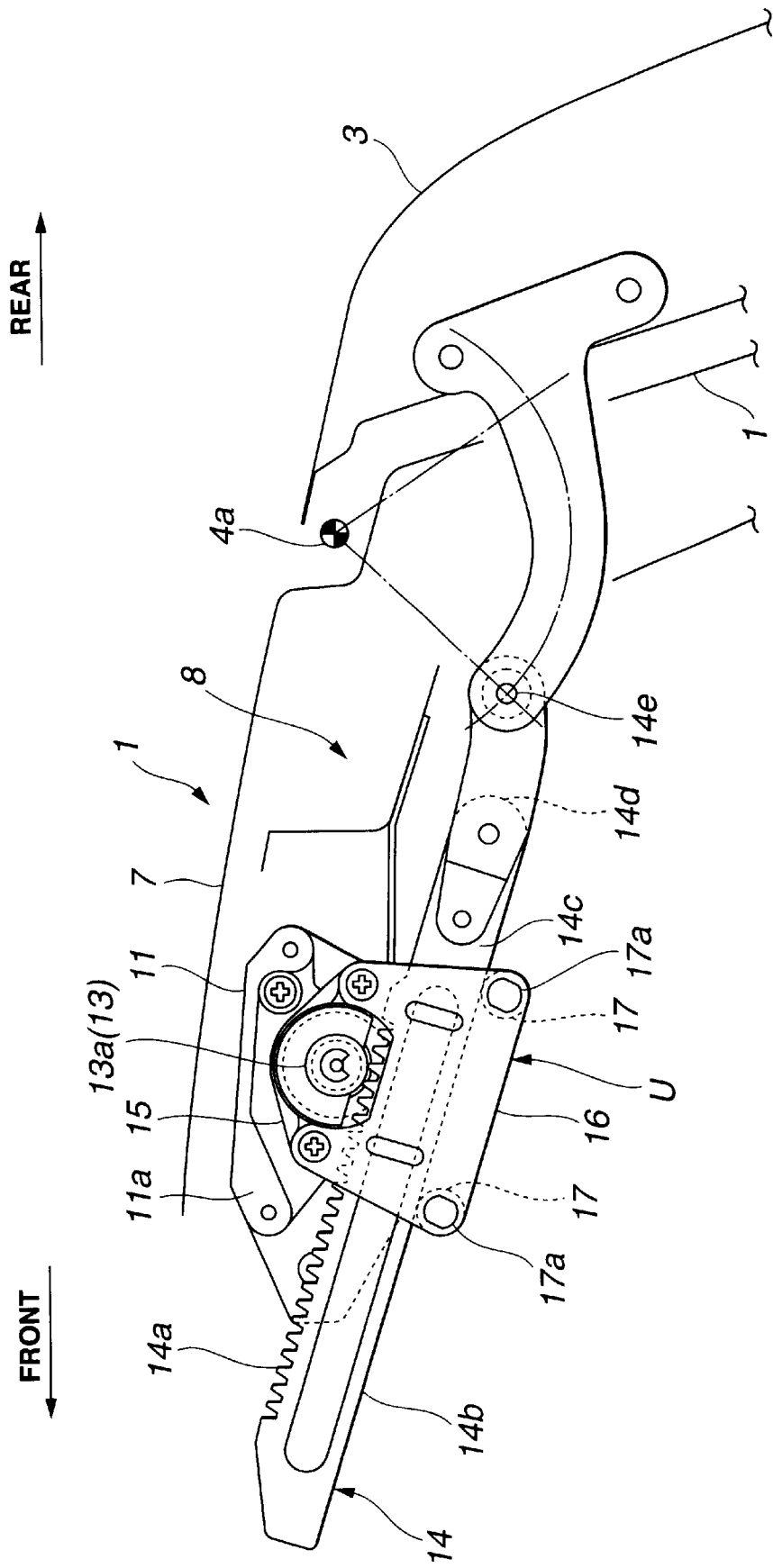
Figure 5:
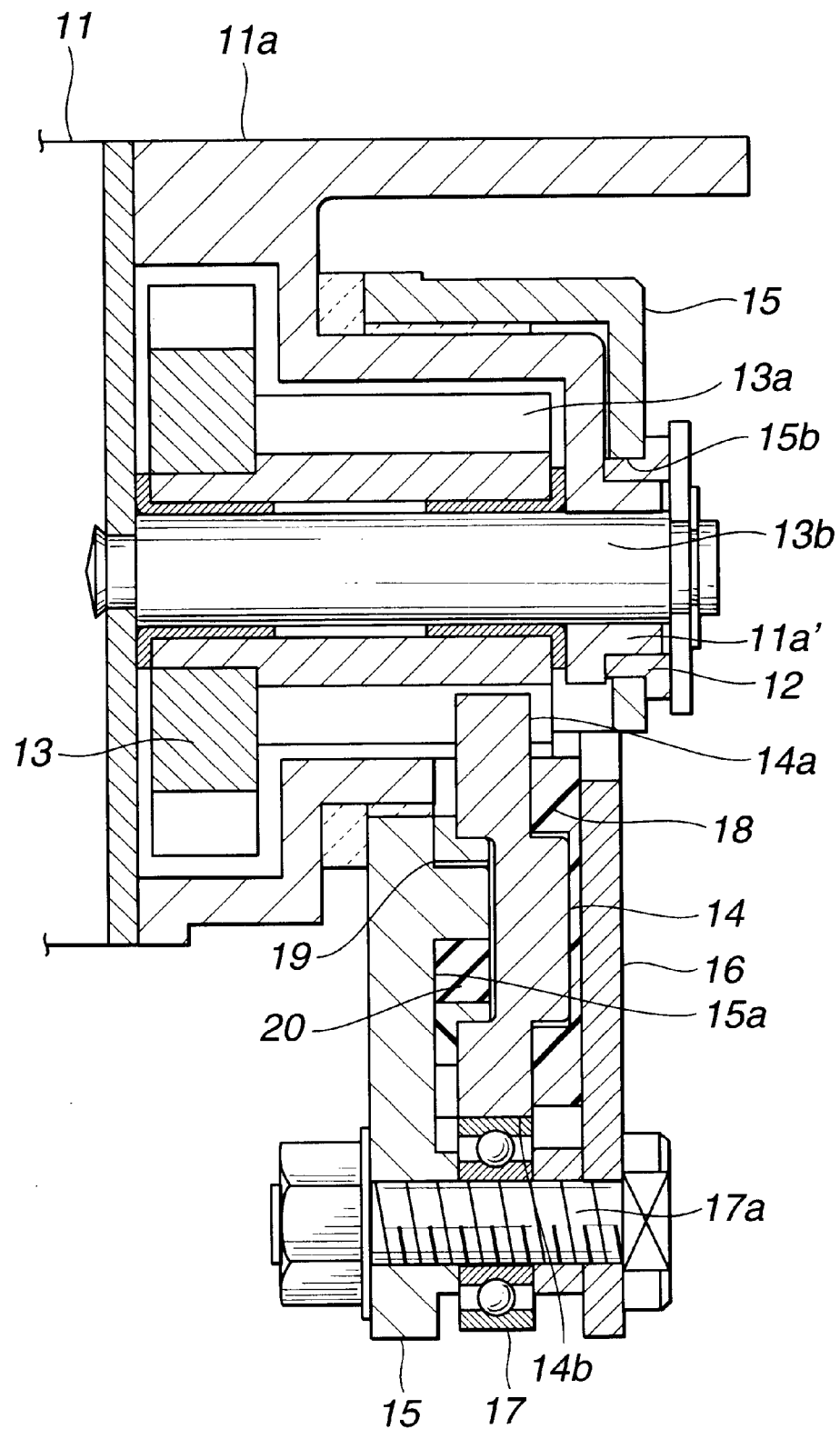
Figure 6:
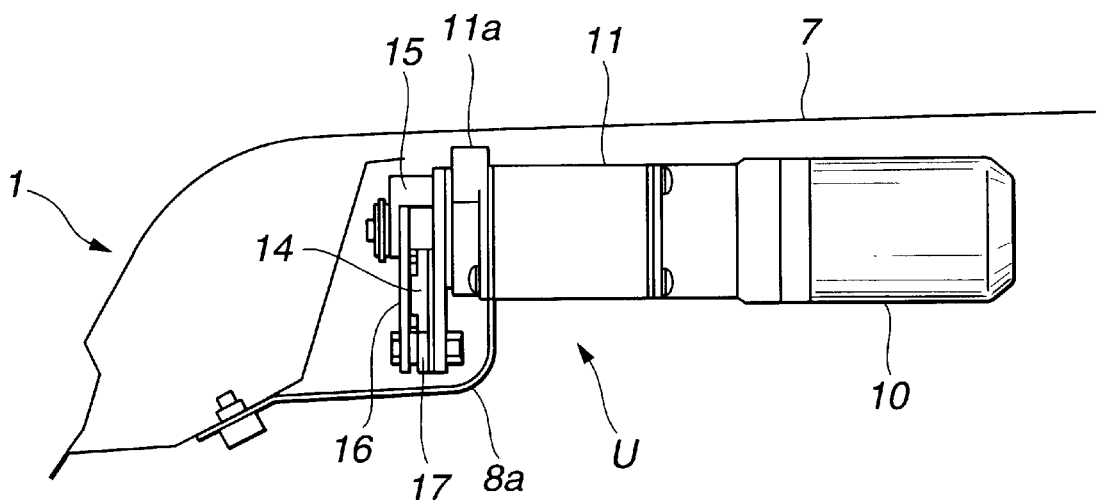

As is seen from FIGS. 3 and 5, the rack member 14 is longitudinally slidably held by a holding member 15. The holding member 15 is held by the case 11a of the speed reduction device 11 in a manner to be swingable about the axis of the output gear 13a. That is, as is seen from FIG. 5, the holding member 15 has an opening 15b which is rotatably received on an annular projection 11a' of the case 11a through an annular bearing member 12. A leading end of a shaft 13b for the pinion 13 (and thus for the output gear 13a) passes through the annular projection 11b. Thus, the holding member 15 can swing about the annular projection 11b, that is, about the axis of the outer gear 13a.

As is seen from FIGS. 2 and 5, the holding member 15 is concealed by a cover member 16.

Figure 9:
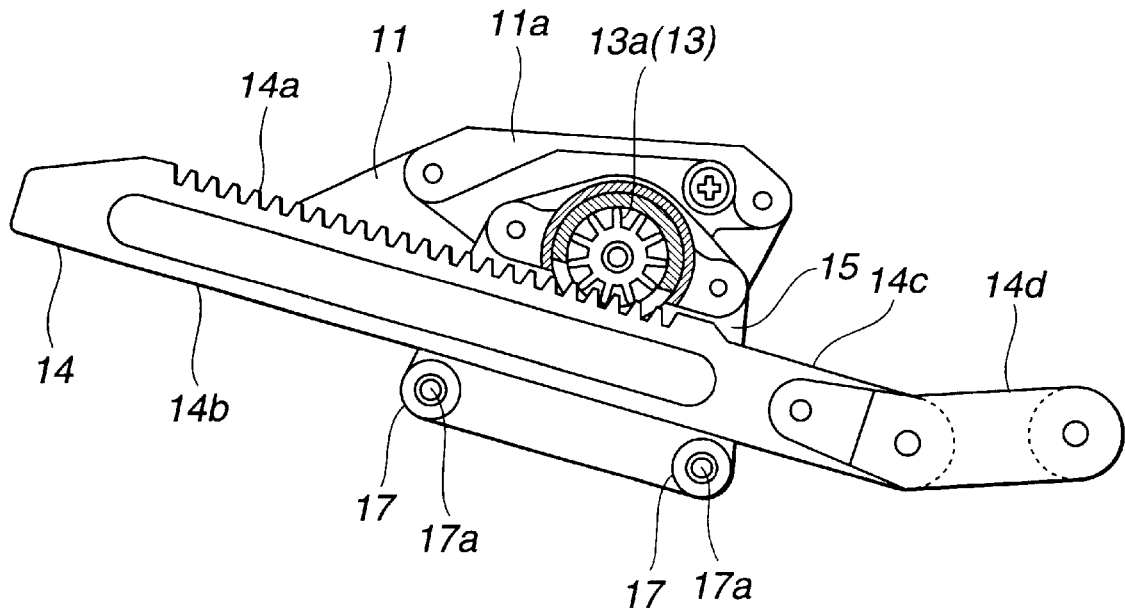
Figure 10:
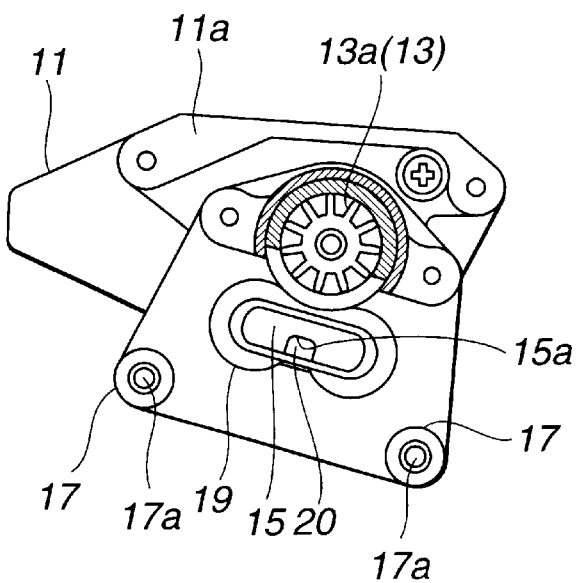

As is seen from FIGS. 9 and 10, the holding member 15 is provided at its lower portion with two spaced rollers 17 which support thereon a lower edge 14b of the rack member 14. The two rollers 17 are spaced from the output gear 13a by the same distance. Each roller 17 is rotatably disposed on a roller pin 17a fixed to the holding member 15.

As is seen from FIGS. 3 and 5, the cover member 16 has an upper portion bolted to holding member 15 and a lower portion fixed to leading ends of the roller pins 17a. Thus, the holding member 15, the two rollers 17 and the cover member 16 constitute a unit which is swingable about the axis of the output gear 13a.

As is seen from FIG. 5, an outer slider 18 of polyacetal resin is disposed between the rack member 14 and the cover member 16 to smooth the movement of the rack member 14 relative to the cover member 16. As is seen from FIGS. 5 and 10, an inner slider 19 of polyacetal resin, which has an oval-ring shape, is disposed between the holding member 15 and the rack member 14 to smooth the movement of the rack member 14 relative to the holding member 15.

As is seen from FIGS. 5, 9 and 10, the holding member 15 is formed, at the portion where the oval-ring shaped inner slider 19 is arranged, with a recess 15a which has a biasing member 20 of rubber press-fitted therein. Due to provision of the biasing member 20, the rack member 14 is constantly biased toward the rollers 17, so that the tooth portion 14a of the rack member 14 is appropriately meshed with the output gear 13a of the speed reduction device 11. If desired, in place of the rubber-made biasing member 20, other member, such as a coil spring, a plate spring or the like may be used.

Figure 4:
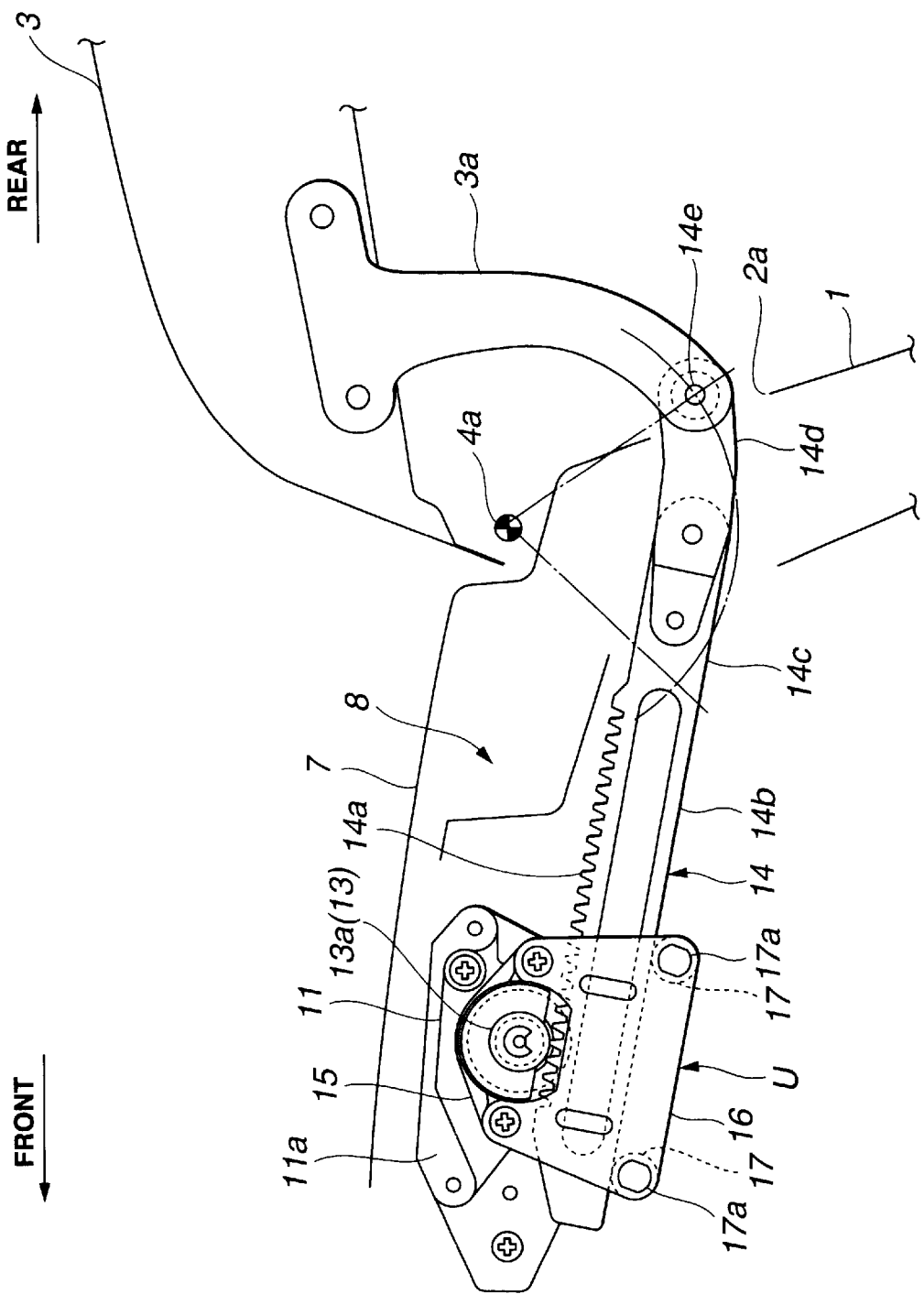

As is seen from FIGS. 2 and 3, to a right end 14c of the rack member 14, there is secured a connecting member 14d which, as is seen from FIG. 4, can be projected at its right end to the outside of the vehicle body through an opening 2a formed in the vehicle body 1. The right end of the connecting member 14d is pivotally connected to a leading end of an arm member 3a through a pivot pin 14e. The arm member 3a is secured at its base portion to an upper side portion of the back door 3. If desired, the connecting member 14d may be integral with the rack member 14.

The motor 10 and the speed reduction device 11 constitute a drive unit "U".

Figure 7:
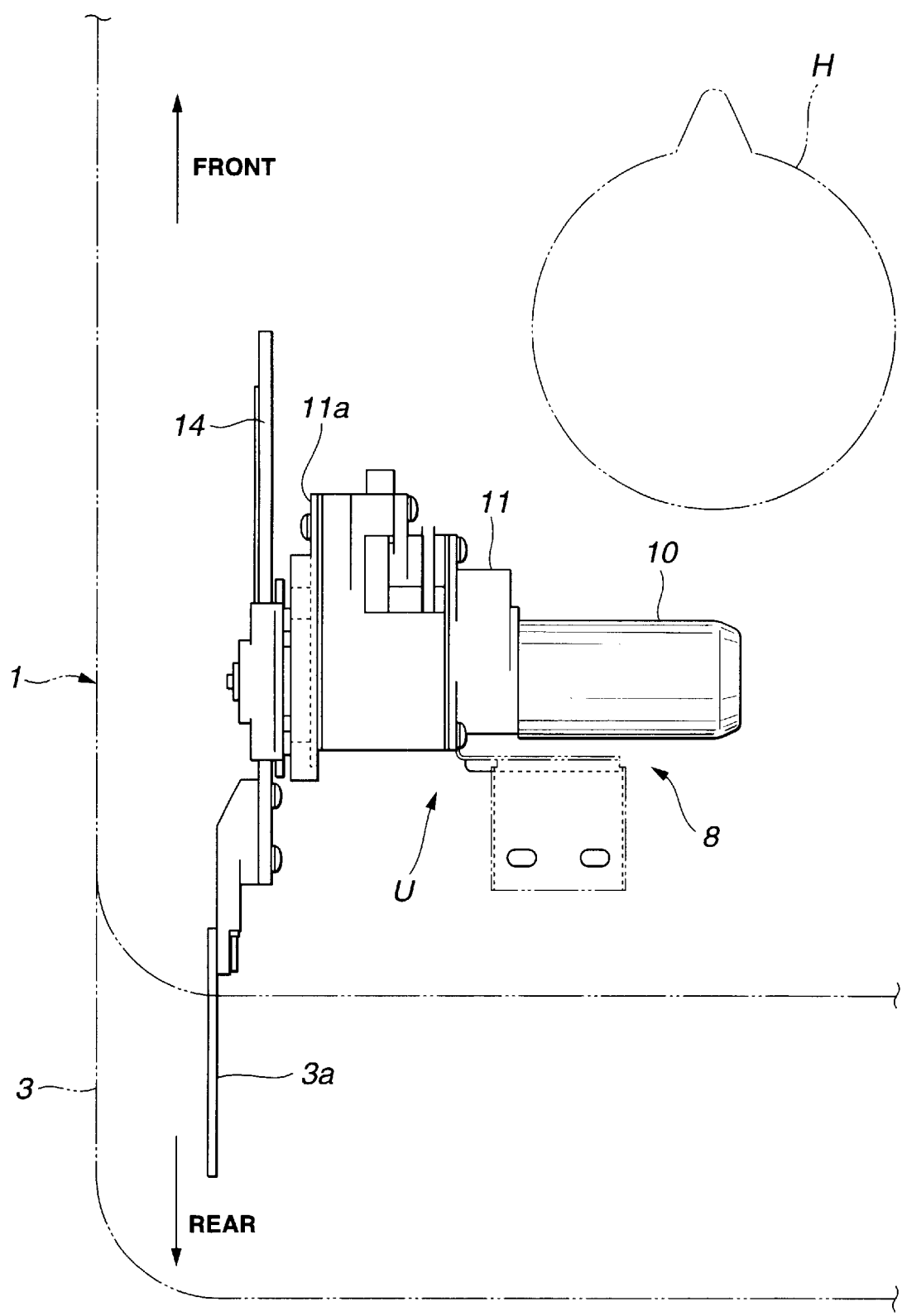

As is seen from FIG. 7, the operating device 8 has a generally L-shaped structure when viewed from the top of the vehicle body 1. That is, the rack member 14 extends in the fore-and-aft direction of the vehicle body 1, and the electric motor 10 is arranged to extend perpendicular to the rack member 14. Thus, because of the L-shaped structure, the operating device 8 can be neatly arranged on a rear corner of the roof panel 7, as shown. That is, the bulky drive unit "U" including the rack member 14, the motor 10 and the speed reduction device 11 can be positioned away from a passenger's head "H", and thus the passenger room can be provided with a satisfied head clearance.

In the following, operation of the operating device 8 of the first embodiment will be described with reference to the drawings.

For ease of understanding, the description will be commenced with respect to the full-close position "B" of the back door 3, which is shown by a solid line in FIG. 1. In this condition, the lock device 5 is engaged with the striker and the operating device 8 assumes such a condition as shown in FIG. 3, that is, a condition wherein the rack member 14 assumes its frontmost position.

When now a manual control switch 24 (see FIG. 16) is actuated in a normal direction, that is, a direction to open the back door 3, the actuator cancels the engagement of the lock device 5 with the striker and at the same time, the electric motor 10 of the operating device 8 is rotated in a normal direction and thus the output gear 13 of the speed reduction device 11 is rotated in a counterclockwise direction in FIG. 3. Upon this, the rack member 14 is slid rearward that is rightward in FIG. 3. Thus, finally, the back door 3 is pushed up to the full-open position "A", as shown in FIG. 4. During this opening movement of the back door 3, the operating device 8 can reduce its output force at the time when the back door 3 comes to the neutral position "C" (see FIG. 1) due to the above-mentioned function of the gas-stays 6.

During the rearward movement of the rack member 14, the pivot pin 14e of the connecting member 14d is forced to make a swing movement about the hinge pin axis 4a, which applies a certain force to the rack member 14 in a direction to swing the same. Thus, the rack member 14 is swung together with the holding member 15 about the axis of the output gear 13a during the rearward movement of the rack member 14. That is, the rack member 14 and the holding member 15 are forced to swing about the axis of the output gear 13a relative to the case 11a of the speed reduction device 11.

Accordingly, during the rearward movement of the rack member 14, the right end 14c of the rack member 14 can swing to smoothly follow the swinging movement of the pivot pin 14e to which the arm member 3a of the back door 3 is pivotally connected. In the illustrated first embodiment, the holding member 15 is swung by an angle of about 10 degrees when the back door 3 is pivoted from the full-close position "B" to the full-open position "A". It is to be noted that the maximum inclination of the rack member 14 corresponds to the inclination of an imaginary tangential line that contacts both a pitch circle of the output gear 13a and a locus described by the pivot pin 14e.

As is seen from FIG. 4, when the back door 3 assumes the full-open position "A", the rack member 14 assumes its rearmost position.

When, now, the manual control switch is actuated in a reverse direction, that is a direction to close the back door 3, the electric motor 10 is rotated in a reverse direction. With this, the rack member 14 is slid forward that is leftward in FIG. 4, pulling the back door 3 toward the full-close position "B" and finally to the full-close position "B". Upon this, the lock device 5 of the door 3 becomes engaged with the striker thereby latching the back door 3 at the full-close position "B".

During the forward movement, the rack member 14 is forced to swing together with the holding member 15, like in the manner as is described hereinabove.

Referring to FIGS. 11 to 15, there is shown an operating device 28 of a second embodiment of the present invention.

Since the operating device of the second embodiment is similar to that of the above-mentioned first embodiment, only parts and portions which are different from those of the first embodiment will be described in the following. Similar parts and portions are denoted by the same numerals as those in the first embodiment.

Figure 11:
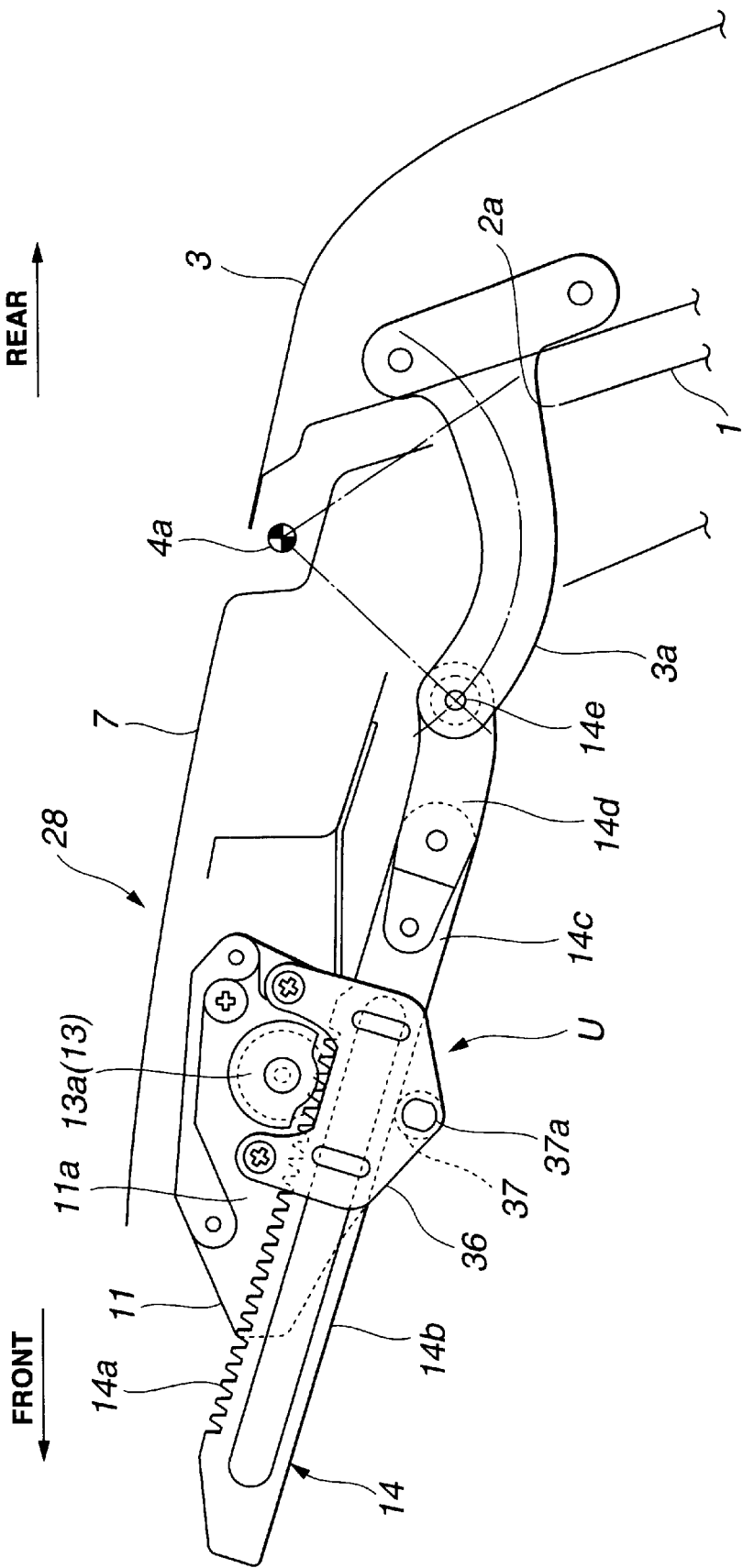
Figure 12:
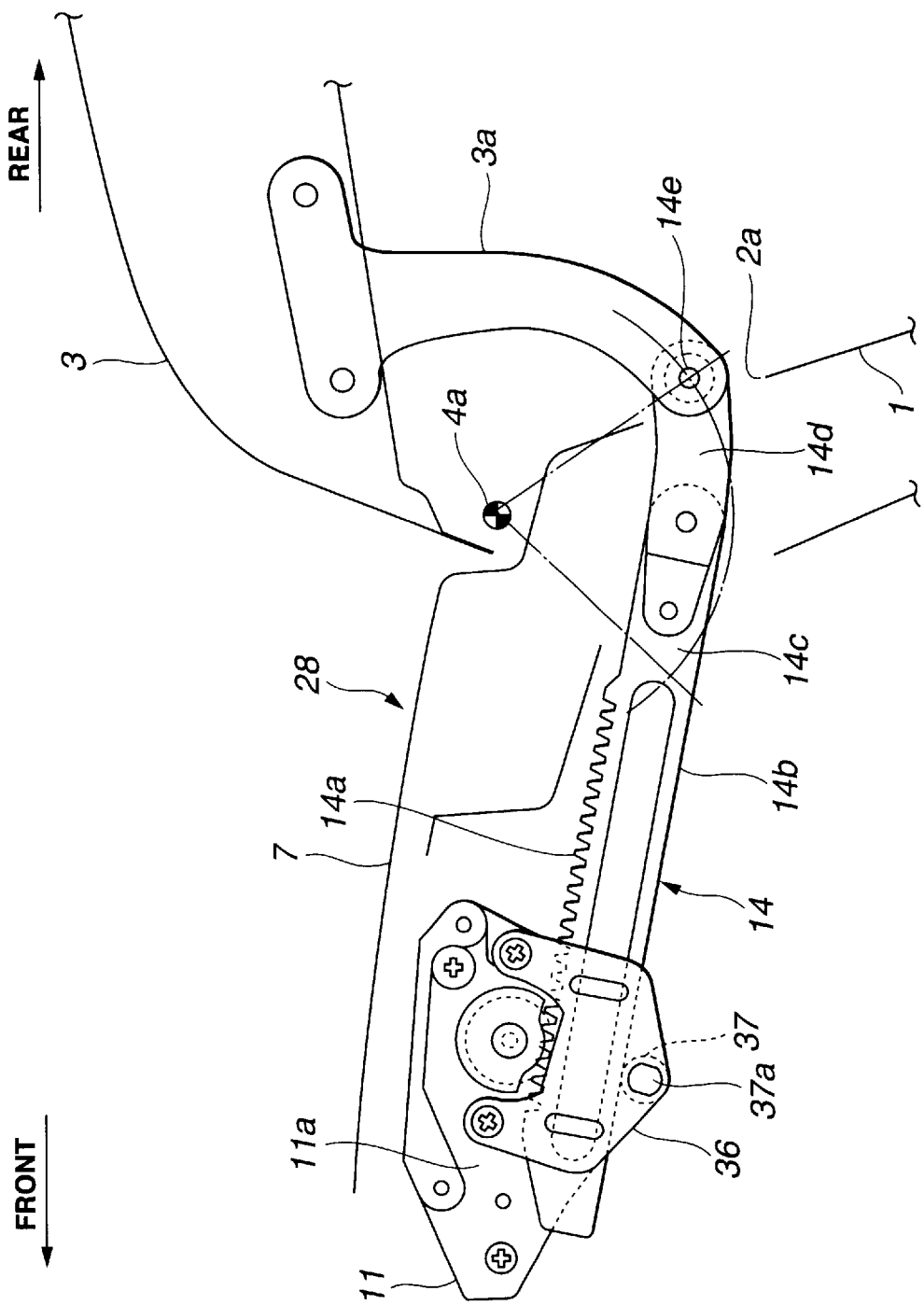

As is seen from FIGS. 11 and 12, like in the first embodiment, on a rear end corner of a roof panel 7, there is mounted the operating device 28 of the second embodiment.

Figure 13:
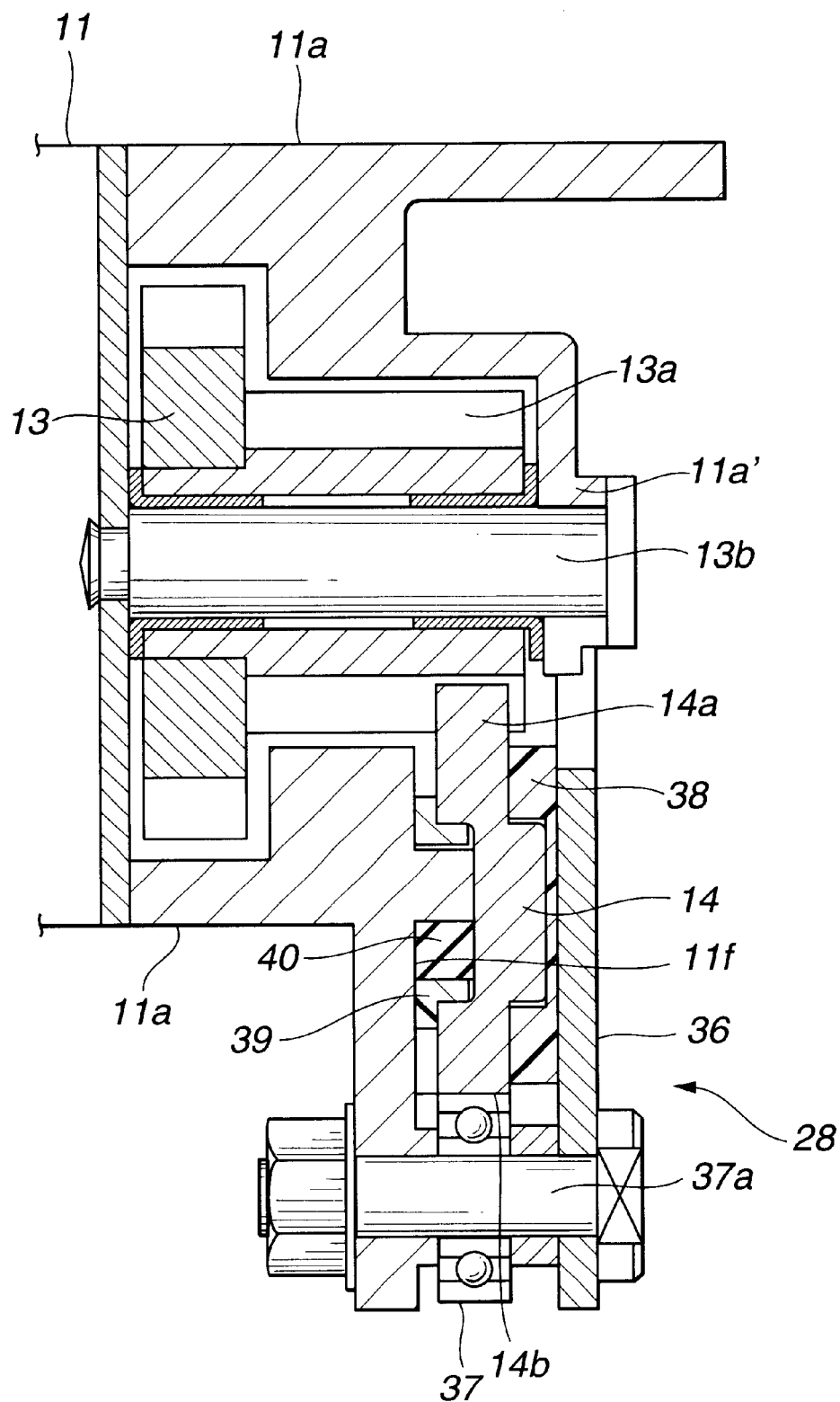
Figure 14:
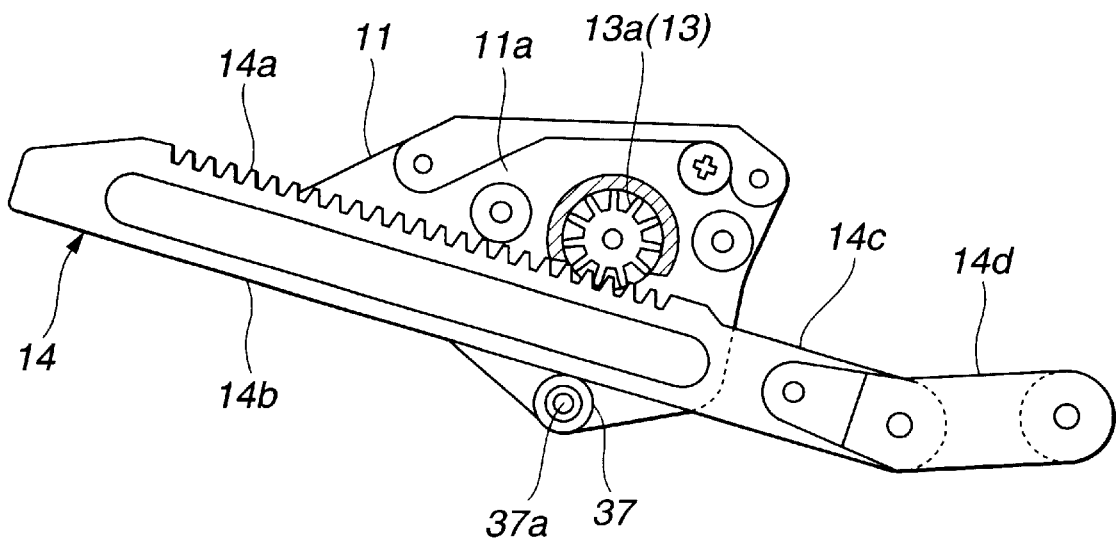

As is seen from FIGS. 11, 13 and 14, in this second embodiment, there is no member corresponding to the holding member 15 used in the first embodiment. That is, only one roller 37 is employed for supporting thereon the lower edge 14a of the rack member 14. The roller 37 is rotatably held by a fixed cover member 36 which is bolted at its upper portions to the case 11a of the speed reduction device 11. As is best shown in FIG. 13, the roller pin 37a for the roller 37 extends between the case 11a and the cover member 36.

It is thus to be noted that unlike the cover member 16 of the first embodiment, the cover member 36 of the second embodiment is not swingable about the axis of the output gear 13a. However, due to the nature of a so-called one point support effected by the roller 37, the rack member 14 can swing on the roller 37 using the same as a fulcrum.

As is seen from FIG. 13, an outer slider 38 of polyacetal resin is disposed between the rack member 14 and the cover member 36 to smooth the movement of the rack member 14. As is seen from FIGS. 13 and 15, and an inner slider 39 of polyacetal resin, which has an oval-ring shape, is disposed between the case 11a and the rack member 14 for smoothing the movement of the rack member 14.

Figure 15:
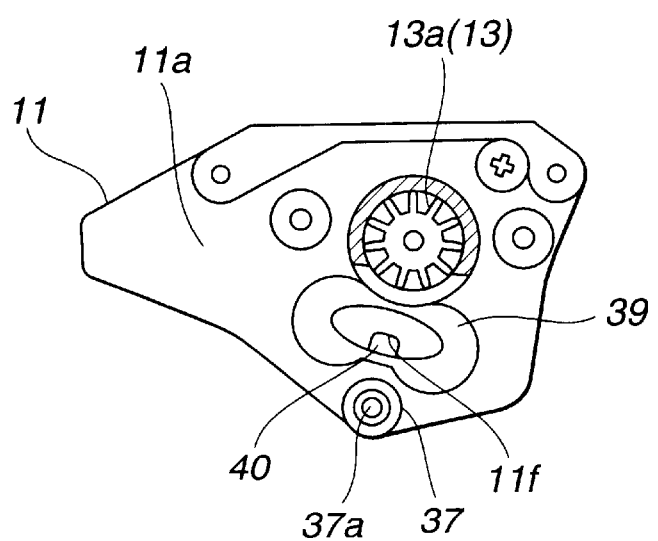

As is seen from FIGS. 13 and 15, the case 11a is formed, at the portion where the oval-ring shaped inner slider 39 is arranged, with a recess 11f which has a pressing member 40 of rubber press-fitted therein. Due to provision of the pressing member 40, the rack member 14 is constantly biased toward the roller 37, so that the tooth portion 14a of the rack member 14 is appropriately meshed with the output gear 13a of the speed reduction device 11. If desired, in place of the rubber-made pressing member 40, other member, such as a coil spring, a plate spring or the like may be used.

In the following, operation of the operating device 28 of the second embodiment will be described with reference to the drawings, particularly FIGS. 11 and 12.

When the back door 3 assumes the full-close position "B" as shown in FIG. 11, the rack member 14 assumes its frontmost position.

When now a manual control switch is actuated in a normal direction, the electric motor 10 is rotated and thus the rack member 14 is slid rearward that is rightward in FIG. 11. Thus, finally, the back door 3 is pushed up to the full-open position "A", as shown in FIG. 12. During this opening movement of the back door 3, the operating device 28 can reduce its output force at the time when the back door 3 comes to the neutral position "C" (see FIG. 1) due to the above-mentioned function of the gas-stays 6.

During the rearward movement of the rack member 14, the pivot pin 14e of the connecting member 14d is forced to make a swing movement about the hinge pin axis 4a, like in the case of the above-mentioned first embodiment. Thus, the rack member 14 is swung on the roller 37 using the same as a fulcrum, during the rearward movement of the rack member 14. That is, the rack member 14 is forced to swing on the roller 37 relative to the case 11a of the speed reduction device 11.

Accordingly, during the rearward movement of the rack member 14, the right end 14c of the rack member 14 can swing to smoothly follow the swinging movement of the pivot pin 14e to which the arm member 3a of the back door 3 is pivotally connected. Similar to the case of the first embodiment, the rack member 14 can swing by an angle of about 10 degrees when the back door 3 is pivoted form the full-close position "B" to the full-open position "A".

Since a reverse operation effected when the back door 3 is pivoted from the full-open position "A" to the full-close position "B" is substantially the same as the above-mentioned operation except for the moving direction of the parts, description of such reverse operation will be omitted.

Figure 16:
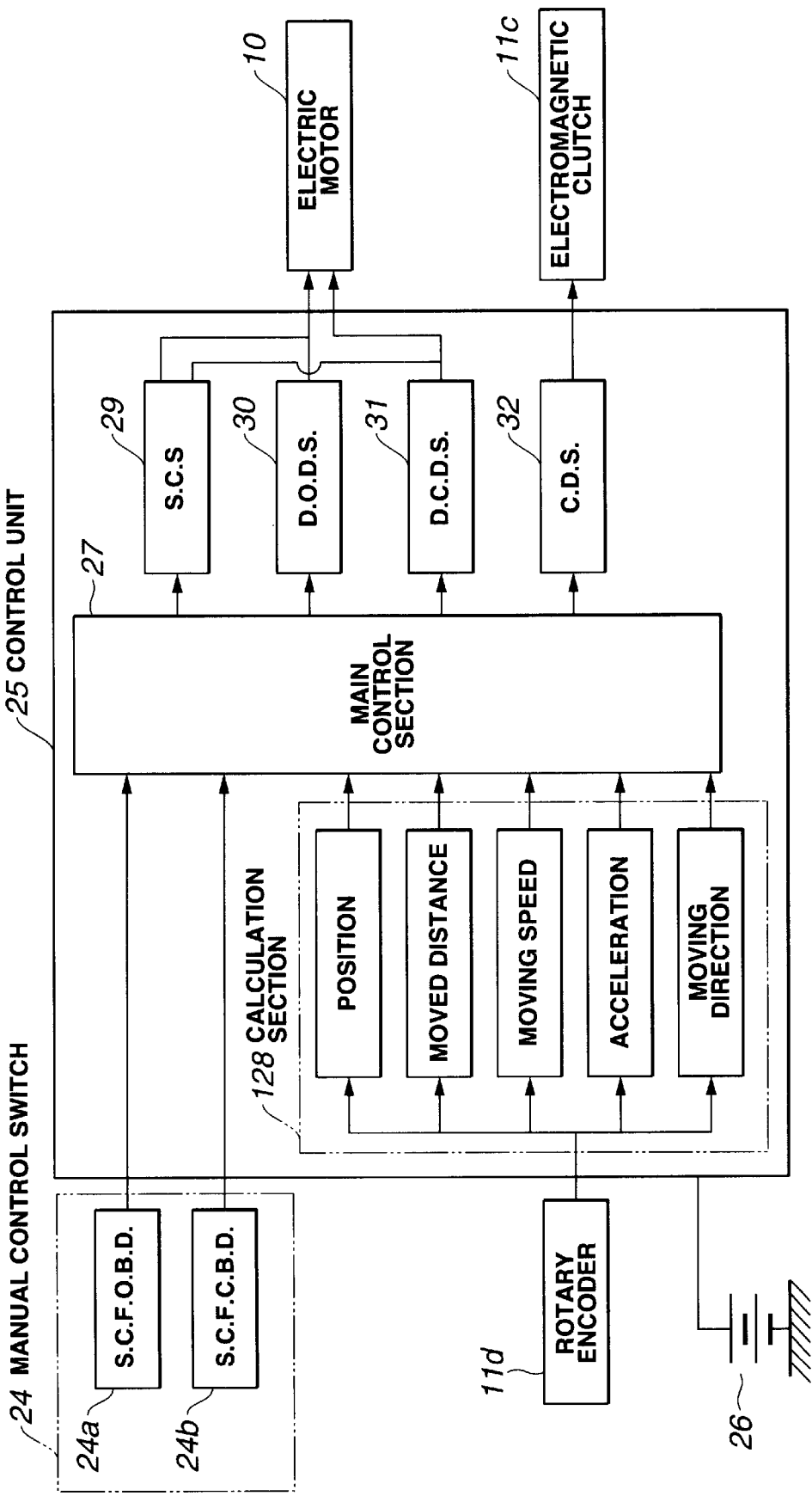
FIG. 16 is a block diagram of a control system which controls operation of the operating device of the first end second embodiments of the present invention.

Referring to FIG. 16, there is shown a block diagram of a control system for controlling the above-mentioned operating device 8 or 28. Denoted by numeral 25 is control unit of the system, which is a microcomputer comprising generally CPU, RAM, ROM and input and output interfaces.

Denoted by numeral 24 is a manual control switch 24 which is arranged in the vicinity of a driver's seat or a position near the back door 3. The switch 24 comprises a switch circuit 24a for opening the back door 3 and another switch circuit 24b for closing the back door 3. Denoted by numeral 26 is a battery which is a power source. The rotary encoder 11d detects the movement of the back door 3 by counting pulses produced by a pulse generator which is driven by the input gear 11d' (see FIG. 8) when the back door 3 pivots.

The control unit 25 comprises a main control section 27 which controls the output in accordance with instruction signals applied thereto from the manual control switch 24 and the rotary encoder 11d. At an input side of the main control section 27, there is arranged a calculation section 128 which processes the pulse signals from the rotary encoder 11d and feed the processed signals to the main control section 27. At an output side of the main control section 27, there are arranged a speed control section 29, a door opening driving section 30 and a door closing driving section 31 which control the motor 10 in accordance with output signals from the main control section 27, and a clutch driving section 32 which controls the electromagnetic clutch 11c (see FIG. 8) in accordance with an output signal from the main control section 27. That is, the manual control switch 24 and the rotary encoder 11d are devices which generate information signals applied to an input part of the control unit 25, and the motor 10 and the electromagnetic clutch 11c are devices which are controlled by instruction signals issued from the control unit 25. The battery 26 is arranged to energize the control unit 25 and the motor 10.

The rotary encoder 11d is constructed to generate two types of pulse signals whose phases are different from each other by 90 degrees. By processing these signals, the calculation section 128 calculates various data of the back door 3 which will be described in the following.

Under pivoting of the back door 3, the rotary encoder 11d generates the pulse signals that are applied to the calculation section 128 of the control unit 25. In the calculation section 128, the pulse signals from the rotary encoder 11d are processed to calculate the position, moved distance, moving speed, acceleration and moving direction of the back door 3. These data are led into the main control section 27. The moving speed and the acceleration of the back door 3 are derived by applying primary and secondary differentiation to the moved distance with time respectively. Thus, the rotary encoder 11d and the calculation section 128 constitute a section which comprises a speed detecting means and an acceleration detecting means.

From the main control section 27, there is issued a drive control signal to either one of the door opening driving section 30 and the door closing driving section 31 to cause the section 30 or 31 to output a drive current having a decided flow direction. After being modified by an instruction signal from the speed control section 29, the drive current is applied to the electric motor 10. At the same time, from the main control section 27, there is also issued a drive signal to the clutch driving section 32, and from the clutch driving section 32, there is issued a driving current to the electromagnetic clutch 11c to drive the same.

Figure 17:
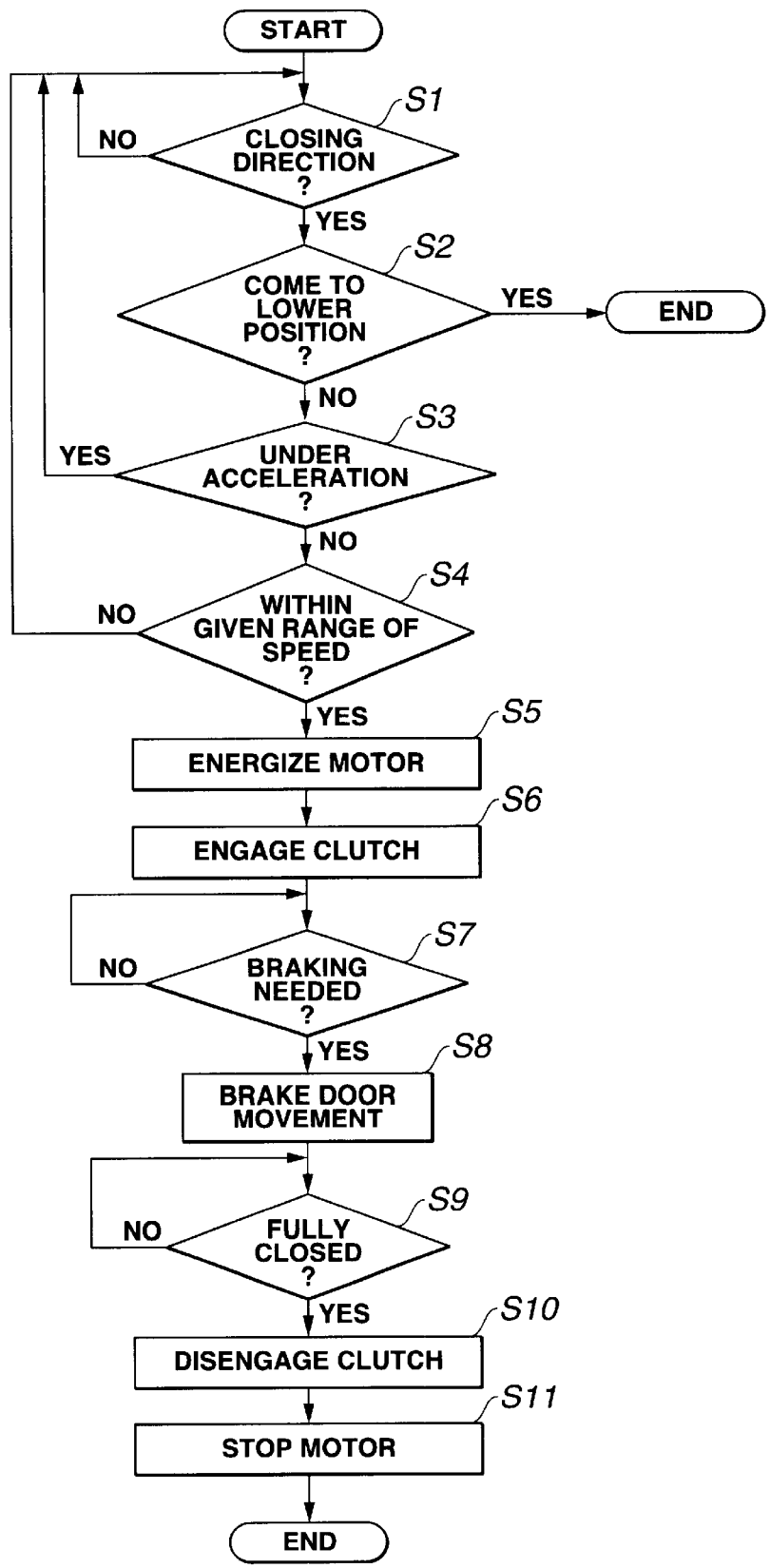
FIG. 17 is a flowchart showing operation steps executed by a control unit of the control system when the back door is pivoted in a closing direction.

Referring to FIG. 17, there is shown a flowchart of programmed operation steps which are executed in the control unit 25 for controlling the pivoting movement of the back door 3 in a direction to close the same. More specifically, the flowchart shows the control of the back door 3 from the time when the door 3 in a larger open position is pushed down by the manual handling to the time when the door 3 is brought to the full-close position "B" by the auto-driving.

At step S1, judgement is carried out as to whether the back door 3 is being pivoted in the closing direction or not. If YES, that is, when the back door 3 is being pivoted in the closing direction, the operation flow goes to step S2. The YES judgment at step S1 is actually provided when, with both the door opening driving section 30 and the door closing driving section 31 being kept inoperative, the rotary encoder 11d senses a given degree of the moved distance of the back door 3.

If NO at step S1, that is, when the back door 3 is not being pivoted downward, the operation flow goes back to START.

At step S2, judgement is carried out as to whether or not the back door 3 under closing pivoting has come to a position below the neutral position "C". If YES, that is, when the back door 3 has come to such a lower position through the neutral position "C", the operation flow goes to END. That is, when the back door 3 comes down to such a lower position below the neutral position "C", the door 3 would be automatically pivoted down to the full-close position "B" due to the biasing force composed of the own weight of the back door 3 and the biasing force produced by the gas-stays 6. Thus, in this case, there is no need of using a power of the operating device 8 (or 28) for moving down the back door 3 to the full-close position "B".

If NO at step S2, that is, when the back door 3 is still at a position above the neutral position "C", the operation flow goes to step S3.

At this step S3, judgement is carried out as to whether the downward pivoting of the back door 3 is under acceleration or not. If YES, that is, when the downward pivoting of the back door 3 is under acceleration, the operation flow goes back to START. The YES judgement at step S3 is actually provided when the acceleration derived by the calculation section 128 of the control unit 25 shows a positive value, that is, in a condition wherein the back door 3 is being pivoted downward manually by an operator. If, under this condition, the manual downward pivoting of the door 3 starts to be assisted by the power of the operating device 8 (or 28), uncomfortable shock would be applied to the operator. Thus, if the downward pivoting of the back door 3 is under acceleration, the auto-driving for the door 3 by the operating device 8 (or 28) is not induced. In other words, the auto-driving for the door 3 takes place only when the downward pivoting of the door 3 shows no acceleration, that is, in a condition wherein the operator is forced to temporarily remove his or her door moving force at the time when the door 3 comes down to a position near the neutral position "C". That is, at such time, the operator is forced to change the door gripping manner in which his or her hand grasps the lower end of the back door 3. When the auto-driving by the operating device 8 (or 28) is commenced at such time, no shock is applied to the operator. For achieving this advantage, the step S3 is provided.

If NO at step 53, that is, when the downward pivoting of the back door 3 is not under acceleration, the operation flow goes to step S4.

At this step S4, judgment is carried out as to whether the moving speed of the back door 3 is within a given range or not. If YES, that is, when the door moving speed is within the given range, the operation flow goes to step S5. The YES judgment as step S4 is actually provided when the moving speed derived by the calculating section 128 of the control unit 25 is within a certain range, that is, in a condition wherein the moving speed is lower than a higher given speed that does not provide the operator with a marked shock upon switching to the auto-driving and higher than a lower given speed that is provided by the manual handling of the door 3 by the operator.

If NO at step S4, that is, when the moving speed of the back door 3 is not within the given range, the operation flow goes back to START.

At step S5, the electric motor 10 is energized and then the operation flow goes to step S6 to engage the electromagnetic clutch 11c. That is, in this operating order, the motor 10 has already rotated when the clutch 11c begins to engage. Thus, the torque of the motor 10 is smoothly transmitted to the rack member 14 of the operating device 8 (or 28) upon switching from the manual handling of the back door 3 to the auto-driving of the same. Due to the steps of S5 and S6, the pivoting of the back door 3 toward the full-close position "B" is carried out by the force produced by the operating device 8 (or 28). The moving speed of the back door 3 at this time is set higher than the higher given speed provided at the step S4, so that the switching from the manual handling to the auto-driving produces substantially no shock.

After the step S6, the operation flow goes to step S7. At this step S7, judgment is carried out as to whether or not the back door 3 has come down to a given position at which braking of the downward pivoting of the door 3 should start. If NO, that is, when the back door 3 has not come to the given position yet, the operation flow goes back to the front of the step S7, and the judgement work is repeated until the back door 3 comes to the given position. The given position is derived by processing the information signal from the rotary encoder 11d by the calculation section 128.

If YES at step S7, that is, when the back door 3 has come down to the given position, the operation flow goes to step S8 to brake the downward movement of the back door 3. Actually, the rotation of the motor 10 is braked. With this, the downward movement of the door 3 is decelerated. Then, the operation flow goes to step S9.

At step S9, judgement is carried out as to whether the back door 3 has come down to the full-close position "B" or not. If NO, that is, when the back door 3 has not come to the full-close position "B" yet, the operation flow goes back to the front of the step S9 and the judgement work is repeated until the back door 3 comes to the full-close position "B". Like in the step S7, the full-close position "B" is derived by processing the information signal from the rotary encoder 11d by the calculation section 128.

If YES at step S9, that is, when the back door 3 has come to the full-close position "B", the operation flow goes to step S10 to disengage the electromagnetic clutch 11c and then to step S11 to deenergize the motor 10. That is, upon receiving OFF signal from the main control section 27 (see FIG. 16), the clutch driving section 32 forces the clutch 11c to take its OFF or disengaged condition and upon receiving a stop signal from the main control section 27, the door closing driving section 31 forces the motor 10 to take its OFF condition.

With the above-mentioned steps, the back door 3 is finally pivoted to the full-close position "B". Actually, when the door 3 comes to the full-close position "B", the lock device 5 (see FIG. 1) becomes engaged with the striker to latch the door 3 in the full-close position "B".

Figure 18:
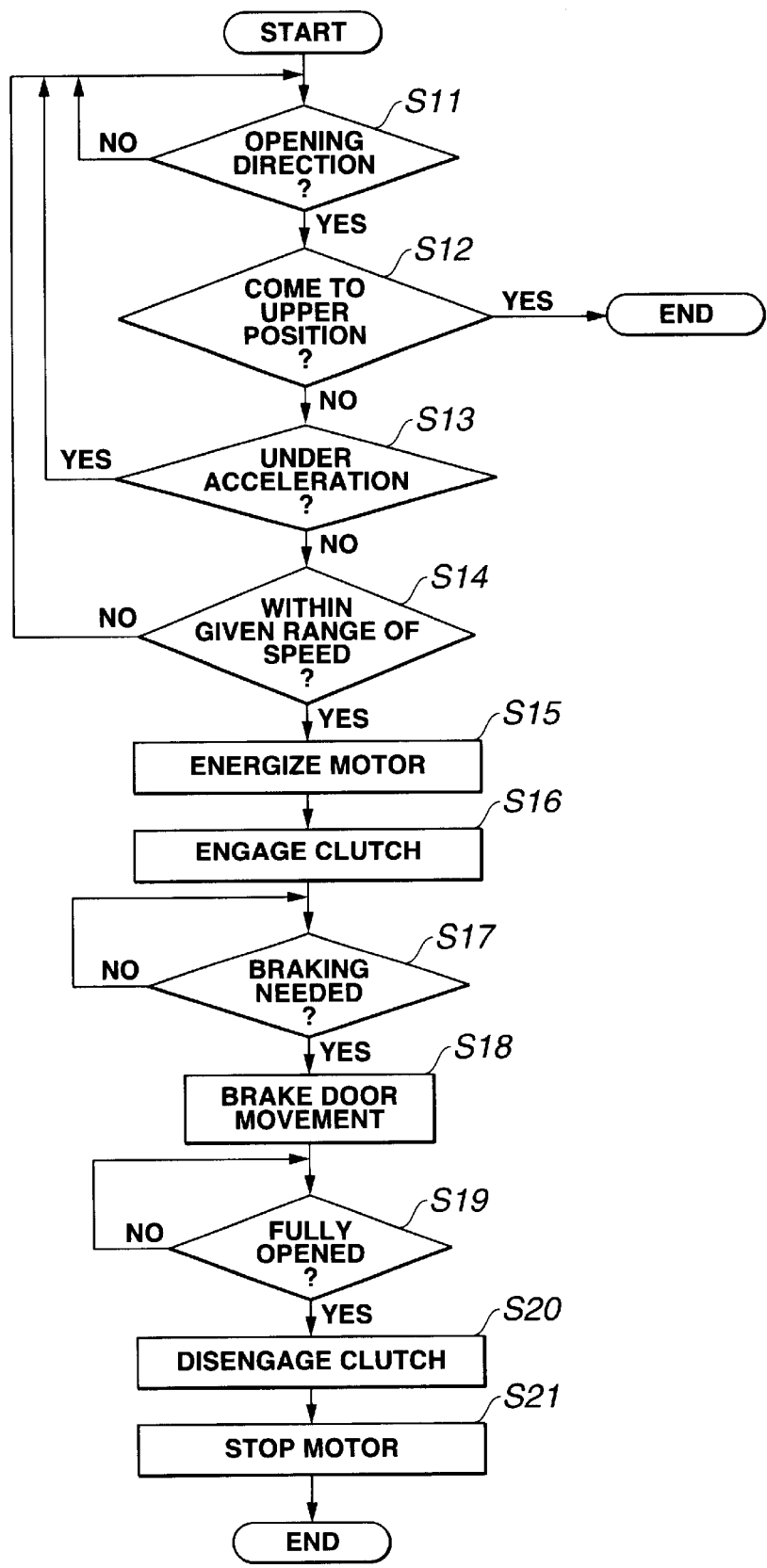
FIG. 18 is a flowchart showing operation steps executed by the control unit when the back door is pivoted in an opening direction.

Referring to FIG. 18, there is shown a flowchart for controlling the pivoting movement of the back door 3 in a direction to open the same. That is, the flowchart shows the control of the back door 3 from the time when the door 3 in a smaller open position is pulled up by the manual handling to the time when the door 3 is brought to the full-open position "A" by the auto-driving.

As step S11, judgement is carried out as to whether the back 3 is being pivoted in the opening direction or not. If YES, that is, the back door 3 is being pivoted in the opening direction, the operation flow goes to step S12. If NO at step S11, that is, when the back door 3 is not being pivoted upward, the operation flow goes back to START.

At step S12, judgement is carried out as to whether or not the back door 3 under opening pivoting has come to a position above the neutral position "C". If YES, that is, when the back door 3 has come to such a higher position through the neutral position "C", the operation flow goes to END. That is, when the back door 3 comes up to such a higher position above the neutral position "C", the door 3 would be automatically pivoted up to the full-open position "A" due to the biasing force produced by the gas-stays 6 against the weight of the door 3. Thus, in this case, there is no need of using a power of the operating device 8 (or 28) for moving up the back door 3 to the full-open position "A".

If NO at step S12, that is, when the back door 3 is still at a position below the neutral position "C", the operation flow goes to step S13.

At this step S13, judgement is carried out as to whether the upward pivoting of the back door 3 is under acceleration or not. If YES, that is, when the upward pivoting of the back door 3 is under acceleration, the operation flow goes back to START. The YES judgement at step S13 is actually provided in a condition wherein the back door 3 is being pivoted upward manually by the operator. If, under this condition, the manual upward pivoting of the door 3 starts to be assisted by the power of the operating device 8 (or 28), a certain shock would be applied to the operator. Thus, if the upward pivoting of the door 3 is under acceleration, the auto-driving for the door 3 by the operating device 8 (or 28) is not induced. In other words, the auto-driving for the door 3 takes place only when the upward pivoting of the door 3 shows no acceleration, that is, in a condition wherein the operator is forced to temporarily remove his or her door moving force at the time when the door 3 comes up to a position near the neutral position "C". That is, at such time, the operator is forced to change the door gripping manner in which his or her hand grasps the lower end of the back door 3. When the auto-driving the operating device 8 (or 28) is commenced at such time, no shock is applied to the operator. For achieving this advantage, the step S13 is provided.

If NO at step S13, that is, when the upward pivoting of the back door 3 is not under acceleration, the operation flow goes to step S14.

At this step S14, judgement is carried out as to whether the moving speed of the back door 3 is within a given range or not. If YES, that is, when the door moving speed is within the given range, the operation flow goes to step S15. The YES judgement is actually provided in a condition wherein the moving speed is lower than a higher given speed that does not provide the operator with a marked shock upon switching to the auto-driving and higher than a lower given speed that is provided by the manual handling of the door 3 by the operator.

If NO at step S14, that is, when the moving speed of the back door 3 is not within the given range, the operation flow goes back to START.

At step S15, the electric motor 10 is energized and then at step S16, the electromagnetic clutch 11c is engaged. Thus, the pivoting of the back door 3 toward the full-open position "A" is carried out by the force produced by the operating device 8 (or 28). The moving speed of the back door 3 at this time is set higher than the higher given speed provided at the step S14, so that the switching from the manual handling to the auto-driving produces substantially no shock.

After the step S16, the operation flow goes to step S17. At this step S17, judgment is carried out as to whether or not the back door 3 has comes up to a given position at which braking of the upward pivoting of the door 3 should start. If NO, that is, when the back door 3 has not come to the given position yet, the operation flow goes back to the front of the step S17, and the judgment work is repeated until the back door 3 comes to the given position.

If YES at step S17, that is, when the back door 3 has come up to the given position, the operation flow goes to step S18 to brake the upward movement of the back door 3. Actually, the rotation of the motor 10 is braked. With this, the upward movement of the door is decelerated. Then, the operation flow goes to step S19.

At step S19, judgment is carried out as to whether the back door 3 has come up to the full-open position "A" or not. If NO, that is, when the back door 3 has not come to the fully-open position "A" yet, the operation flow goes back to the front of the step S19 and the judgement work is repeated until the back door 3 comes to the full-open position "A".

If YES at step S19, that is, when the back door 3 has come to the full-open position "A", the operation flow goes to step S20 to disengage the electromagnetic clutch 11*c* and then to step S21 to deenergize the motor 10.

With the above-mentioned steps, the back door 3 is finally pivoted to the full-open position "A".

The entire contents of Japanese Patent Applications 2000-089768 (filed Mar. 28, 2000) and 2000-092715 (filed Mar. 30, 2000) are incorporated herein by reference.

Although the invention has been described hereinabove with reference to the embodiments of the invention, the invention is not limited to the embodiments as described hereinabove. That is, various modifications and variations of the embodiments may be carried out by those skilled in the art, in light of the above descriptions.

What is claimed is:

1. An operating device for operating a pivotal door, comprising:
    an electric motor of reversible type;
    a speed reduction device driven by said motor, said speed reduction device having an output part formed into an output gear;
    a rack member having a toothed side edge meshed with said output gear, so that upon energization of said motor, said rack member is moved axially;
    a motion transmitting member having one end pivotally connected to one end of said rack member and the other end connected to said pivotal door; and
    a structure which permits a swing movement of said rack member about an axis of said output gear when an external force is applied to said rack member in a direction to swing the same during the axial movement of the rack member.

2. An operating device as claimed in claim 1, in which said structure comprises a holding member which holds said rack member in a manner to permit the axial movement of the rack member relative thereto, said holding member being held by said speed reduction device in a manner to be pivotal about the axis of said output gear.

3. An operating device as claimed in claim 2, in which said structure further comprises rollers rotatably connected to said holding member, each roller engaging a side edge of said rack member.

4. An operating device as claimed in claim 3, in which said structure further comprises a cover member connected to said holding member to define therebetween a space through which said rack member axially moves.

5. An operating device as claimed in claim 4, in which structure further comprises:
    an outer slider disposed between said rack member and said cover member to smooth the axial movement of the rack member relative to the cover member; and
    an inner slider disposed between the said rack member and said holding member to smooth the axial movement of the rack member relative to the holding member.

6. An operating device as claimed in claim 5, in which said structure further comprises a biasing member which is held by said holding member to bias said rack member toward said output gear thereby to assure the meshed engagement between said rack member and said output gear.

7. An operating device as claimed in claim 6, in which said holding member is formed with a recess in which said biasing member is intimately put.

8. An operating device as claimed in claim 2, in which said holding member is formed with an opening which is rotatably received on an annular projection of a case of said speed reduction device, said annular projection having a shaft of said output gear passed therethrough.

9. An operating device as claimed in claim 8, in which an annular bearing member is arranged between a periphery of said opening and said annular projection.

10. An operating device as claimed in claim 1, in which said structure comprises a holding unit which holds said rack member in a manner to permit the axial movement of the rack member relative thereto, said holding unit being secured to said speed reduction device in a manner to permit the swing movement of said rack member about the axis of said output gear.

11. An operating device as claimed in claim 10, in which said holding unit comprises a roller which is rotatably connected to a case of said speed reduction device, said roller engaging a side edge of said rack member.

12. An operating device as claimed in claim 11, in which said holding unit further comprises a cover member connected to a case of said speed reduction device to define therebetween a space through which said rack member axially moves.

13. An operating device as claimed in claim 12, in which said holding unit further comprises:
    an outer slider disposed between said rack member and said cover member to smooth the axial movement of the rack member relative to the cover member; and
    an inner slider disposed between said rack member and said case of the speed reduction device to smooth the axial movement of the rack member relative to said case.

14. An operating device as claimed in claim 13, in which said holding unit further comprises a biasing member which is held by said case of the speed reduction device to bias said rack member toward said output gear thereby to assure the meshed engagement between said rack member and said output gear.

15. An operating device as claimed in claim 14, in which said case of the speed reduction device is formed with a recess in which said biasing member is intimately put.

16. An operating device as claimed in 12, in which said cover member has an upper portion bolted to the case of said speed reduction device and a lower portion connected to a roller pin of said roller.

17. An operating device as claimed in claim 1, further comprising an electromagnetic clutch which is arranged between said electric motor and said speed reduction device to selectively establish connection or disconnection therebetween.

18. An operating device as claimed in claim 17, further comprising a control system which controls operation of said motor and said electromagnetic clutch in accordance with the pivotal movement of said pivotal door.

19. An operating device as claimed in claim 18, in which said control system comprises:
   a manual control switch which selectively produces a door opening signal or a door closing signal when actuated;
   a rotary encoder incorporated with said speed reduction device to produce a pulse signal representing the moving manner of said pivotal door; and
   a control unit for controlling the movement of said pivotal door in accordance with information possessed by said pulse signal issued from said rotary encoder and information possessed by said door opening and closing signals issued from said manual control switch.

20. An operating device as claimed in claim 19, in which said control unit comprises:
   a first section which derives a position of said pivotal door by processing said pulse signal;
   a second section which derives a moved distance of said pivotal door by processing said pulse signal;
   a third section which derives a moving speed of said pivotal door by processing said pulse signal;
   a fourth section which derives an acceleration of said pivotal door by processing said pulse signal;
   a fifth section which derives a moving direction of said pivotal door by processing said pulse signal; and
   a main control section which controls said motor and said electromagnetic clutch based on the information provided by said manual control switch and said first to fifth sections, in such a manner that when the movement of the pivotal door is carried out manually and fails to show a positive acceleration, switching takes place to drive the movement of the pivotal door by a power produced by said motor.

21. An operating device as claimed in claim 20, in which said main control section controls said motor and said electromagnetic clutch in such a manner that when the movement of the pivotal door is carried out manually and shows the door moving speed lower than a higher given speed, switching takes place to drive the movement of the pivotal door by the power of said motor.

22. An operating device as claimed in claim 21, in which said main control section controls said motor and said electromagnetic clutch in such a manner that when the movement of the pivotal door is carried out manually and shows the door moving speed higher than a lower given speed, switching takes place to drive the movement of the pivotal door by the power of said motor.

23. An operating device as claimed in claim 22, in which said higher given speed is set lower than a speed that is provided when the movement is made by the power of said motor.

24. In a motor vehicle having a pivotal door which is pivotally connected at its upper end to a rear end of a roof of the vehicle,
   an operating device for operating said pivotal door, comprising:
      an electric motor of reversible type mounted on the rear end portion of the roof;
      a speed reduction device connected to and driven by said motor, said speed reduction device having an output part formed into an output gear;
      a rack member having a toothed side edge meshed with said output gear, so that upon energization of said motor, said rack member is moved axially;
      a motion transmitting member having one end pivotally connected to one end of said rack member and the other end connected to said pivotal door;
      a holding member for holding said rack member permitting the axial movement of the rack member relative thereto, said holding member being held by said speed reduction device in a manner to be pivotal about the axis of the output gear;
      two rollers rotatably connected to the holding member, each roller putting thereon the other side edge of said rack member;
      a cover member connected to said holding member to define therebetween a space through which said rack member axially moves;
      an outer slider of plastics disposed between said rack member and said cover member to smooth the axial movement of the rack member relative to the cover member;
      an inner slider of plastics disposed between said rack member and said holding member to smooth the axial movement of the rack member relative to the holding member; and
      a biasing member held by the holding member to bias the rack member toward said output gear to assure the meshed engagement between the rack member and the output gear.

25. In a motor vehicle having a pivotal door which is pivotally connected at its upper end to a rear end of a roof of the vehicle,
   an operating device for operating said pivotal door, comprising:
      an electric motor of reversible type mounted on the rear end portion of the roof;
      a speed reduction device connected to and driven by said motor, said speed reduction device having an output part formed into an output gear;
      a rack member having a toothed side edge meshed with said output gear, so that upon energization of said motor, said rack member is moved axially;
      a motion transmitting member having one end pivotally connected to one end of said rack member and the other end connected to said pivotal door;
      a single roller rotatably connected to a case of the speed reduction device to put thereon the other side edge of said rack member, said roller being arranged to permit a pivotal movement of said rack member about the axis of said output gear;
      a cover member connected to said case of the speed reduction device to define therebetween a space through which said rack member axially moves;
      an outer slider of plastics disposed between said rack member and said cover member to smooth the axial movement of the rack member relative to the cover member;
      an inner slider of plastics disposed between said rack member and said case of the speed reduction device to smooth the axial movement of the rack member relative to said case; and
      a biasing member held by the case of the speed reduction device to bias the rack member toward said output gear to assure the meshed engagement between the rack member and the output gear.

* * * * *

(12) EX PARTE REEXAMINATION CERTIFICATE (5418th)
United States Patent
Yuge et al.

(10) Number: US 6,382,706 C1
(45) Certificate Issued: Jun. 20, 2006

(54) OPERATING DEVICE FOR AUTOMOTIVE PIVOTAL DOOR

(75) Inventors: Masaaki Yuge, Yokohama (JP); Zhenjia Zhou, Yokohama (JP)

(73) Assignee: Ohi Seisakusho Co., Ltd., Yokohama (JP)

Reexamination Request:
No. 90/006,743, Aug. 13, 2003

Reexamination Certificate for:
Patent No.: 6,382,706
Issued: May 7, 2002
Appl. No.: 09/813,980
Filed: Mar. 22, 2001

(30) Foreign Application Priority Data

Mar. 28, 2000 (JP) .......................................... 2000-089768
Mar. 30, 2000 (JP) .......................................... 2000-092715

(51) Int. Cl.
*B60J 5/10* (2006.01)

(52) U.S. Cl. ................................ 296/146.4; 296/146.8; 296/106

(58) Field of Classification Search .............. 296/146.8, 296/106, 56, 146.4; 49/341, 342, 339
See application file for complete search history.

(56) References Cited

FOREIGN PATENT DOCUMENTS

DE 198 46 764 A1 4/1999
DE 199 60 373 A1 6/2001

*Primary Examiner*—Lori L. Coletta

(57) ABSTRACT

An operating device for operating an automotive pivotal door has the following elements, which are an electric motor or reversible type; a speed reduction device driven by the motor and having an output part formed into an output gear; a rack member having a toothed side edge meshed with the output gear, so that upon energization of the motor, the rack member is moved axially; a motion transmitting member having one end pivotally connected to one end of the rack member and the other end connected to the pivotal door; and a structure which permits a swing movement of the rack member about an axis of the output gear when an external force is applied to the rack member in a direction to swing the same during the axial movement of the rack member. For appropriately controlling the operating device, a computer-aided control unit is employed.

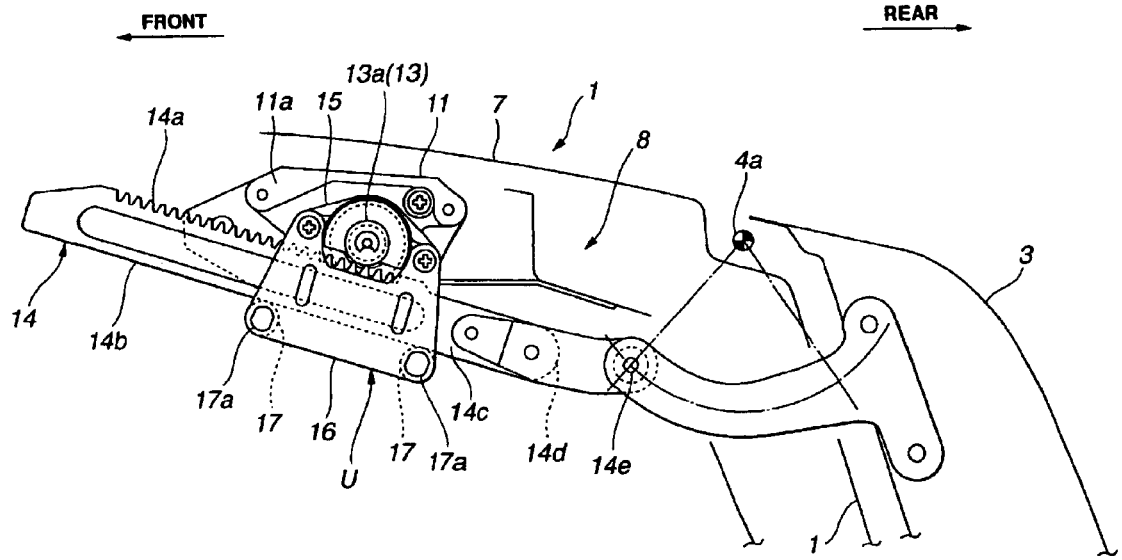

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 24 and 25 is confirmed.

Claim 1 is determined to be patentable as amended.

Claims 2–23, dependent on an amended claim, are determined to be patentable.

1. An operating device for operating a pivotal door, comprising:

an electric motor of reversible type;

a speed reduction device driven by said motor, said speed reduction device having an output part formed into an output gear;

a rack member having a toothed side edge meshed with said output gear, so that upon energization of said motor, said rack member is moved axially;

a motion transmitting member having one end pivotally connected to one end of said rack member and the other end connected to said pivotal door; [and]

a structure which permits a swing movement of said rack member about an axis of said output gear when an external force is applied to said rack member in a direction to swing the same during the axial movement of the rack member, *and*

*at least one slider which is shaped and arranged to assure a mesh engagement between the toothed side edge of the rack member and outer gear and to suppress a lateral displacement of the rack member.*

* * * * *